United States Patent [19]

Hongu

[11] Patent Number: 5,872,639
[45] Date of Patent: Feb. 16, 1999

[54] MULTI-FUNCTION FACSIMILE APPARATUS CONNECTIBLE TO COMPUTERS AND COMMUNICATION LINES

[75] Inventor: Takahiro Hongu, Tokyo, Japan

[73] Assignee: NEC Corporation, Tokyo, Japan

[21] Appl. No.: 602,054

[22] Filed: Feb. 15, 1996

[30] Foreign Application Priority Data

Feb. 15, 1995 [JP] Japan .................................. 7-026389

[51] Int. Cl.$^6$ ............................. H04N 1/41; H04N 1/32; H04N 1/00
[52] U.S. Cl. ......................... 358/426; 358/468; 358/403; 382/232
[58] Field of Search .................................... 358/407, 442, 358/426, 401, 468, 403, 434, 440; 382/232, 234

[56] References Cited

U.S. PATENT DOCUMENTS

| 4,652,933 | 3/1987 | Koshiishi ................................. 358/426 |
| 5,377,016 | 12/1994 | Kashiwagi et al. ...................... 358/468 |
| 5,506,692 | 4/1996 | Murata .................................... 358/442 |

FOREIGN PATENT DOCUMENTS

| 0 262 603 | 4/1988 | European Pat. Off. . |
| 0 541 398 | 3/1993 | European Pat. Off. . |
| 0 602 967 | 6/1994 | European Pat. Off. . |
| 1-293063 | 9/1989 | Japan . |
| 1-238366 | 11/1989 | Japan . |

Primary Examiner—Thomas D. Lee
Attorney, Agent, or Firm—Foley & Lardner

[57] ABSTRACT

Print data received from a computer (1) is converted into first image data in a dot format by a printer emulator (2). The first image data, a second image data from document read circuits (3, 4), and a third image data received through a facsimile communication control circuit (12) are encoded through an encoding circuit (6) according to an identical coding scheme into first through third encoded image data, respectively, which are stored in an image data memory (8). Control circuits (7, 13) control storage in and reading from the image data memory (8). The control circuit (13) stores first through third destination information designating a transfer destination of each of the first through third encoded image data, and controls the system so that each of the first through third encoded image data is outputted to the output circuit designated by the respective destination information based on the first through third destination information. The output circuit is a printer engine (10) or the facsimile communication control circuit (12) connected to a facsimile apparatus at the other end.

8 Claims, 8 Drawing Sheets

MULTI-FUNCTION FACSIMILE APPARATUS CONNECTIBLE TO COMPUTERS AND COMMUNICATION LINES

BACKGROUND OF THE INVENTION

1. Field of the Invention

The present invention relates to a multi-function facsimile apparatus connectible to computers and communication lines, and more particularly to a facsimile apparatus capable of using data from computers for printing and facsimile communications.

2. Description of the Prior Art

An example of prior art multi-function facsimile apparatuses connectible to computers is disclosed in Japanese Patent laid-open publication HEI 1(1989)-238366. This facsimile apparatus is constructed with an interface connected to a host computer, a printer emulator, a facsimile communication control circuit and an image scanner. The printer emulator receives data from the host computer via the interface, and converts the received data into dot data according to a print instruction code from the computer to form data capable of being faxed. The data from the printer emulator is faxed to the address under control of a given facsimile communication control circuit. When a document is read with an image scanner, the read data is faxed to the given address through the facsimile communication control circuit.

However, regarding the above type of facsimile machine, there has not been given any description as to control for temporarily and individually storing data from the host computer and data received from a facsimile apparatus at the other end, in a memory or other storage circuit, and then recording and outputting the data to a common recorder circuit.

In addition, Japanese Patent laid-open publication HEI 1(1989)-293063 describes a multimedia communication system constructed by connecting a personal computer (hereunder abbreviated to "PC") with a facsimile apparatus. Referring to FIG. 1, a communication control circuit 100 of the multimedia communication system is connected to a PC 200 and a facsimile apparatus 300. A PC communication control section 101 transfers text data from the PC 200 to a mail data section 102a or a text data section 102b of a file memory 102. A facsimile communication control section 103 transfers image data from a facsimile apparatus 300 to an image data section 102c of the file memory 102. A common service section 104 controls the file memory 102, and manages the image data, the text data and the mail data. A mail box circuit 105 manages the mail data section 102a, and controls transmission and reception of the mail data.

When the text data from the PC 200 is being transmitted to the facsimile apparatus 300, the common service section 104 reads the text data stored in the text data section 102b to transfer it to the facsimile communication control section 103. The facsimile communication control section 103 then converts the text data to image data as dot data which is transmitted to the facsimile apparatus 300 according to a facsimile communication protocol. The mail data stored in the mail data section 102a may also be transmitted to other PCs and the facsimile apparatus 300.

With the multimedia communication system illustrated in FIG. 1, however, the data managed by the common service section 104 are the text data or mail data from the PC 200, and the image data from the facsimile apparatus 300 which are information in different formats. Accordingly, the file memory 102 has completely isolated storage areas for the image data and the text data, and this results in complicated management required for each data. An additional drawback of the prior art is an increased capacity required for the file memory 102 in cases where a large volume of text data or image data is being stored in the file memory 102.

SUMMARY OF THE INVENTION

It is an object of the present invention to provide a multi-function facsimile apparatus which allows a simplification of data management by encoding, according to an identical coding scheme, data received from computers, data received through facsimile communication and data read by a document image scanner, and storing the three kinds of encoded image data in an image data storage circuit as an image data file.

It is another object of the present invention to provide a multi-function facsimile apparatus capable of transmitting the encoded image data stored in the image data storage circuit to a recorder circuit and a facsimile apparatus at the other end as desired.

The multi-function facsimile apparatus according to the present invention converts characters, text data or graphic data received from a computer into first image data constructed by dot pattern data. The first image data have the same format as line scan data generated for ordinary facsimile communication. Further, second image data are generated by a document read circuit having scanner. The second image data have the same format as the first image data. Moreover, third image data are received from a line under control of a facsimile communication control circuit.

The first through third image data are encoded into first through third encoded image data, respectively, through an encoding circuit according to an identical coding scheme. The encoding circuit may be provided individually for each of the image data, or a single or two encoding circuit or circuits may be used instead. Use of individual encoding circuits allows independent and simultaneous encoding of the first through third image data. In contrast, use of a common encoding circuit results in selecting and encoding only one of the first through third image data at a time.

The first through third encoded image data are stored in an image data storage circuit. The image data storage circuit stores the first through third encoded image data in addition to management information for discrimination among the first through third encoded image data. The storage and management are operated under control of a control circuit.

The control circuit has a destination storage circuit for storing first through third destination information designating transfer destinations of the respective first through third encoded image data. The control circuit controls the system in such a manner that the first through third encoded image data are sent to the output circuits designated by the respective destination information stored in the destination storage circuit. The designation of the destinations triggers decoding of the first, second and third encoded image data read from the image data storage circuit into the original first, second and third image data through a decoding circuit, which are then transferred to output circuits designated by the destination information.

The output circuits include a recorder circuit such as a printer engine or a thermal head, and a facsimile communication control circuit connected to a facsimile apparatus at the other end.

According to the present invention, data from computers, data from document read circuits and fax-received data are converted into image data in an identical data format, encoded according to a common coding scheme, and then stored in the image data storage circuit. As a result, the first through third encoded image data in the image data storage circuit are placed under common management, and therefore operations for reading and writing the encoded image data are not complex.

In addition, the image data storage circuit may be divided into a plurality of storage areas to allow individual management, based on management information, of the storage areas allotted to the first, second and third encoded image data. This management contributes to more efficient use of idle areas of still-unstored storage areas. It is possible to change the storage areas for the first through third encoded image data based on the management information. The control of the management and change of the storage areas can be accomplished only through storage of the image data encoded according to a common coding scheme, in the same image data storage circuit.

It is also possible to change output circuits for outputting the first through third image data by renewing the destination information stored in the destination storage circuit by a destination information input circuit.

DETAILED DESCRIPTION OF THE PREFERRED EMBODIMENTS

Figure 2:
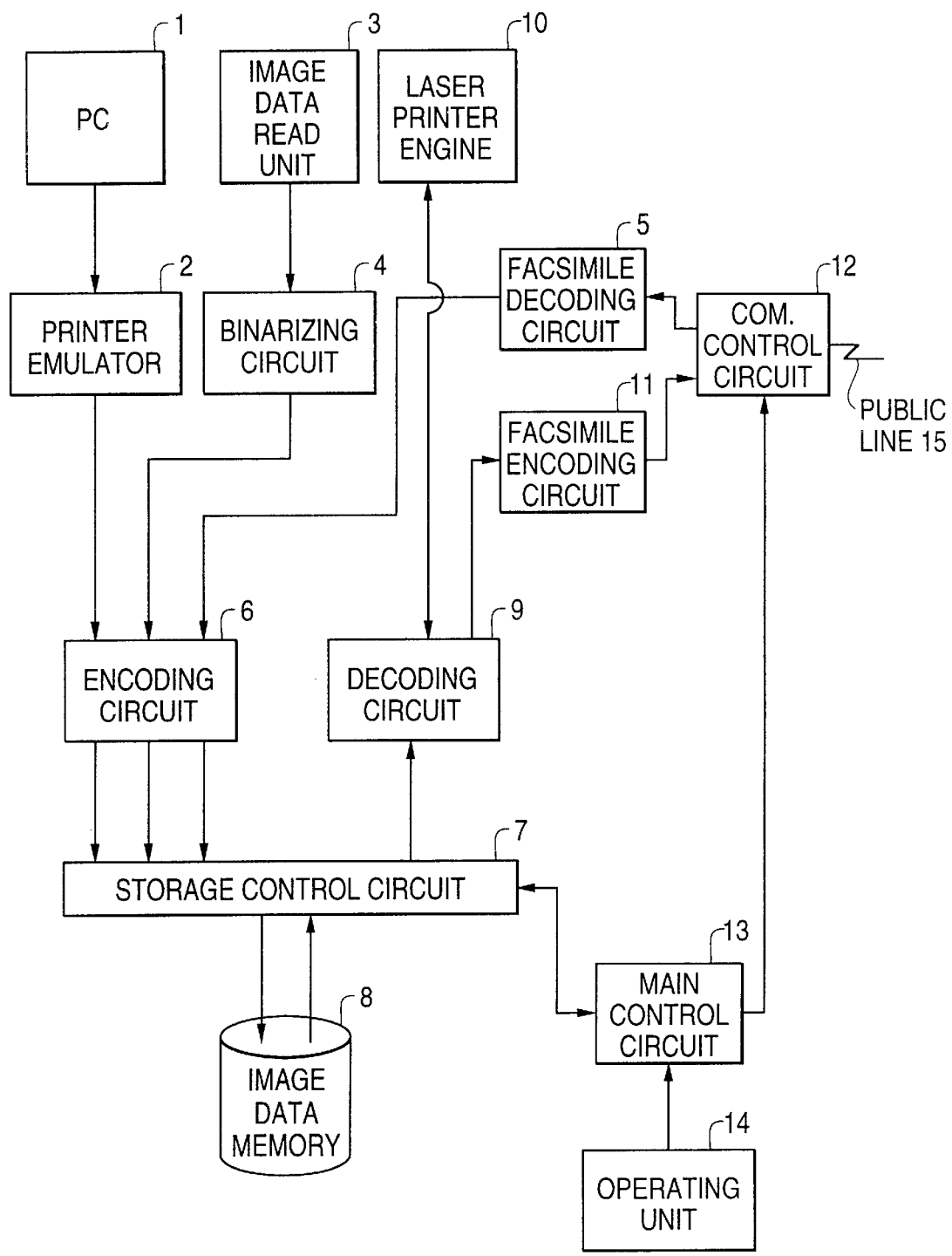
FIG. 2 is a block diagram illustrative of a communication system using a multi-function facsimile apparatus according to a first embodiment of the present invention.

Referring to FIG. 2, the multi-function facsimile apparatus according to a first embodiment of the present invention is connected to a personal computer 1 (hereunder abbreviated to "PC") and a public line 15. This multi-function facsimile apparatus is constructed with a printer emulator circuit 2 which is connected to the PC 1; an image data read unit 3; a binarizing circuit 4; a facsimile decoding circuit 5; an encoding circuit 6 for encoding image data from the printer emulator circuit 2, the binarizing circuit 4 and the facsimile decoding circuit 5 according to a given coding scheme for data compression; an image data memory 8 for storing the encoded image data from the encoding circuit 6 via a storage control circuit 7; a decoding circuit 9 for decoding the encoded image data read via the storage control circuit 7 into the original image data; a laser printer engine 10 for printing the decoded data; a facsimile encoding circuit 11 for encoding the decoded data; a communication control circuit 12 for controlling connections to the public line 15 and controlling facsimile communication; a main control circuit 13 for controlling the overall system; and an operating unit 14. Although the main control circuit 13 controls all the circuits except that of the PC 1, arrows representing the control lines between the main control circuit 13 and each of the blocked circuits are omitted in FIG. 2 for simplicity of the drawing.

The printer emulator 2 converts print data such as text data, character data and graphic data from the PC 1 into 400 dpi bit map data, for example. This conversion into bit map data is executed based on the document size designated by the size data transferred from the PC 1 to generate first image data matching the document size (e.g., A4-size, B5-size, etc.). This first image data is the same type of data as is generated when a read circuit using a image scanner like a CCD scans a document at a resolution of 400 dpi, and is also data in a format capable of being directly outputted to the laser printer engine 10.

The image data read unit 3 reads a document by scanning with a CDD to generate image signals. The binarizing circuit 2 binarizes the image signals, and generates second image data in the same bit map format as the first image data.

The facsimile decoding circuit 5 decodes the encoded image data received from the public line via the line control circuit 12 to generate third image data. This third image data from the facsimile decoding circuit 5 is data in the same bit map format as the first and the second image data.

The first image data from the printer emulator 2, the second image data from the binarizing circuit 4 and the third image data from the facsimile decoding circuit 5 do not always have an identical resolution. Nevertheless, there is no need to vary the resolutions as long as the laser printer engine 10 includes a printing capability corresponding to the respective resolutions of the first through the third image data. Alternatively, the PC 1 may be designed to send a command to the printer emulator 2 for generating first image data matching the resolution of the laser printer engine 10.

Figure 3:
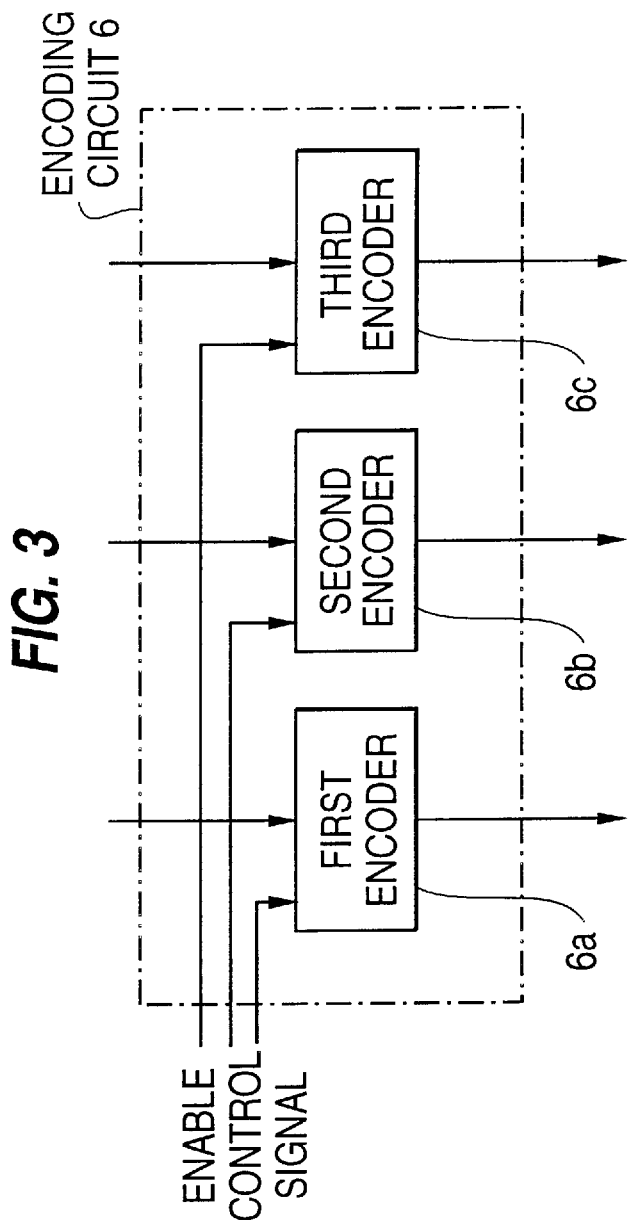
FIG. 3 is a block diagram illustrative of details of the encoding circuit of the facsimile apparatus shown in FIG. 1.

The first through third image data are transferred to the encoding circuit 6. As illustrated in FIG. 3, the encoding circuit 6 is constructed with a first encoder 6a for encoding the first image data to generate first encoded image data, a second encoder 6b for encoding the second image data to generate second encoded image data, and a third encoder 6c for encoding the third image data to generate third encoded image data. The first through third encoders 6a through 6c begin encoding according to enable signals supplied from the main control circuit 13, respectively, to generate serial encoded image data. The respective encoders are based on MH or MR coding schemes which are used for facsimile coding, and the same coding scheme is used to encode them. The first through third encoded image data from the encoding circuit 6 are stored in the image data memory 8 under control of the storage control circuit 7 and the main control circuit 13.

The image data memory 8 stores the first through third encoded image data. It also stores management information for discrimination among the first through third encoded image data from the encoded circuit 6. Its storage and management is placed under control of the storage control circuit 7 and the main control circuit 13.

Figure 4:
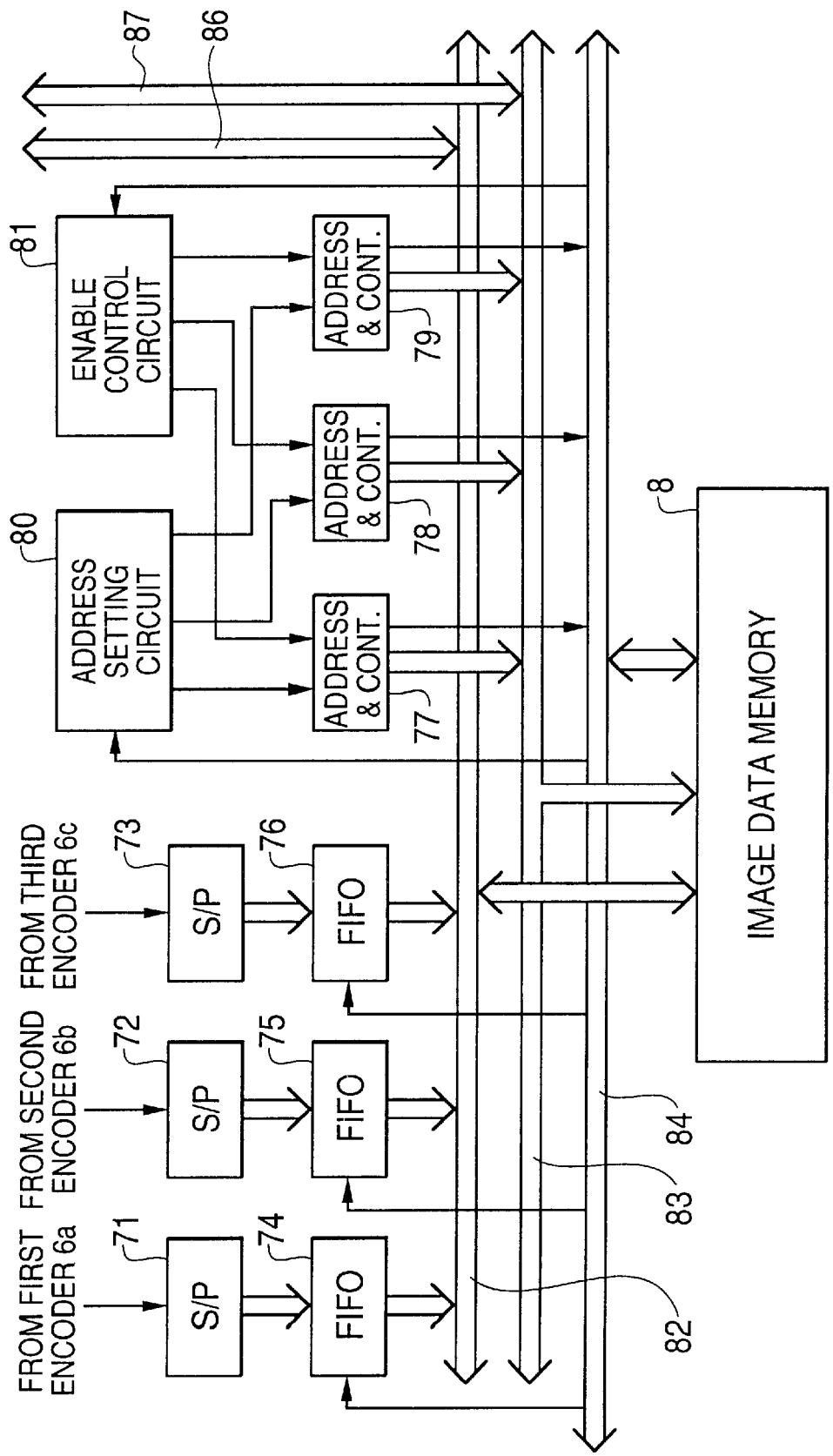
FIG. 4 is a block diagram illustrative of details of the storage control circuit of the facsimile apparatus shown in FIG. 1.
Figure 5:
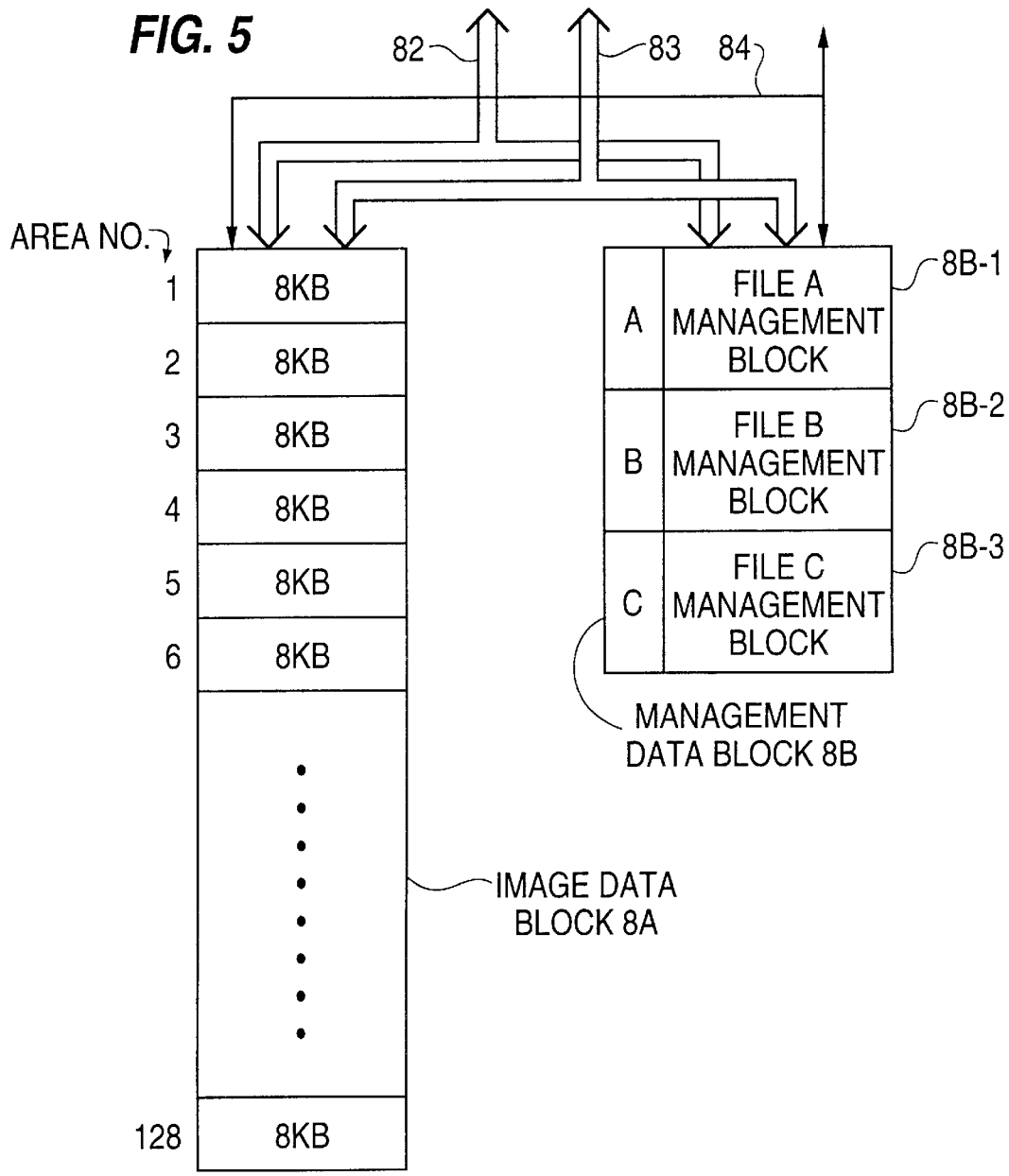
FIG. 5 is a block diagram illustrative of details of the image data memory of the facsimile apparatus shown in FIG. 1.

FIG. 4 is a block diagram illustrative of details of the storage control circuit 7, and FIG. 5 is a block diagram illustrative of the image data memory 8. Referring to FIG. 4 and FIG. 5, connections between the storage control circuit 7 and the image data memory 8 are established by a data bus 82, an address bus 83 and a control bus 84. The first through third encoded image data from the encoding circuit 6 illustrated in FIG. 3 are converted into parallel 16 bit data by serial/parallel (S/P) converter circuits 71 through 73 of the storage control circuit 7. The parallel data from the S/P converter circuits 71 through 73 are temporarily stored in first-in, first-out (FIFO) memories 74 through 76, respectively, and then transferred to the image data memory 8 via the data bus 82.

The first, second and third encoded image data from the FIFO memories 74, 75 and 76 are stored in the image data memory 8 under the addressing and write control of the address generation/control circuits 77, 78 and 79, respectively. The address generation/control circuits 77, 78 and 79 output address signals to the address bus 83, and write control signals and read control signals to the control bus 84.

Upon generation of write control signals and address signals by the address generation/control circuit 77, the first encoded image data from the FIFO memory 74 is stored in the image data memory 8 via the data bus 82. Upon generation of write control signals and address signals by the address generation/control circuit 78, the second encoded image data from the FIFO memory 75 is stored in the image data memory 8. Upon generation of write control signals and address signals by the address generation/control circuit 79, the third encoded image data from the FIFO memory 76 is stored in the image data memory 8.

The generation of the address signals and control signals from the address generation/control circuits 77, 78 and 79 are caused by an enable control circuit 81. In cases where data are being written to all the FIFO memories 74 through 76, the address generation/control circuits 77, 78 and 79 are repeatedly enabled in relays. In contrast, only the address generation/control circuit 77 is enabled in cases where data is being written only to the FIFO memory 74. The enable control circuit 81 outputs enable signals by the control signal sent from the main control circuit 13 illustrated in FIG. 1 via the control bus 84.

An address setting circuit 80 sets or changes the storage areas in the image data memory 8 for the first through third encoded image data upon receipt of instructions from the main control circuit 13.

Referring to FIG. 5, the image data memory 8 comprises an image data block 8A for storing the first through third image data from the data bus 82, and a management data block 8B for storing management information for discrimination among the first, second and third encoded image data. The image data block 8A is partitioned into 8 kb (kilobit) storage areas each assigned area numbers 1 through 128. The storage areas are divided into File A, File B and File C. For example, File A is storage areas of numbers 1 through 40, File B is storage areas of numbers 41 through 80, and File C is storage areas of numbers 81 through 128.

The management data block 8B is divided into a File A management block 8B-1, a File B management block 8B-2 and a File C management block 8B-3. The File A management block 8B-1 stores the area numbers 1–40 of File A as management information, the File B management block 8B-2 stores the area numbers 41–80 of File B as management information, and the File C management block 8B-3 stores the area numbers 81–128 of File C as management information. The area numbers stored as the management information are written by the main control circuit 13 through the data bus 82.

The addresses of Files A, B and C are assigned by the address generation/control circuits 77, 78 and 79 of the storage control circuit 7. As a result, File A stores the first encoded image data from the FIFO memory 74, File B stores the second encoded image data from the FIFO memory 75, and File C stores the third encoded image data from the FIFO memory 76.

Figure 7:
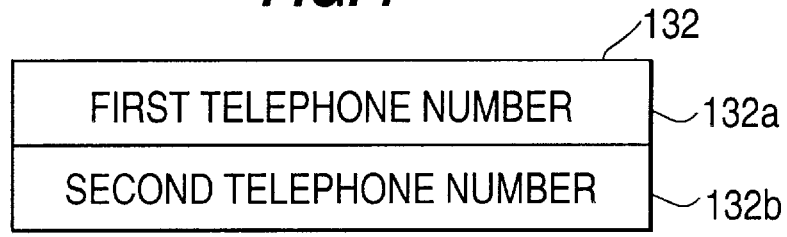
FIG. 7 is a block diagram illustrative of contents of the destination storage circuit of the main control circuit shown in FIG. 6.

The main control circuit 13 instructs the address setting circuit 80 illustrated in FIG. 7 to change the addresses, and the storage areas of Files A, B and C, that is, the storage areas of the image data block 8A which store the first through third encoded image data. The addresses are changed by changing the area numbers to be written to the management data block 8B illustrated in FIG. 5. Thus, the storage areas of Files A, B and C may be changed. For example, the storage areas of File A may be changed to those having area numbers 1–30 and those having area numbers 50–70. In addition, the main control circuit 13 may monitor idle areas in the storage areas of the image data block 8A illustrated in FIG. 5, to change the storage areas based on information on the idle areas. Although the first, second and third encoded image data are stored in Files A, B and C, respectively, according to instructions from the main control circuit 13 in the foregoing embodiment, the encoded image data to be stored in the respective files are determined and may be changed by the main control circuit 13.

The management information stored in the management data block 8B of the image data memory 8 is read as instructed, to identify the storage areas of Files A, B and C.

Figure 1:
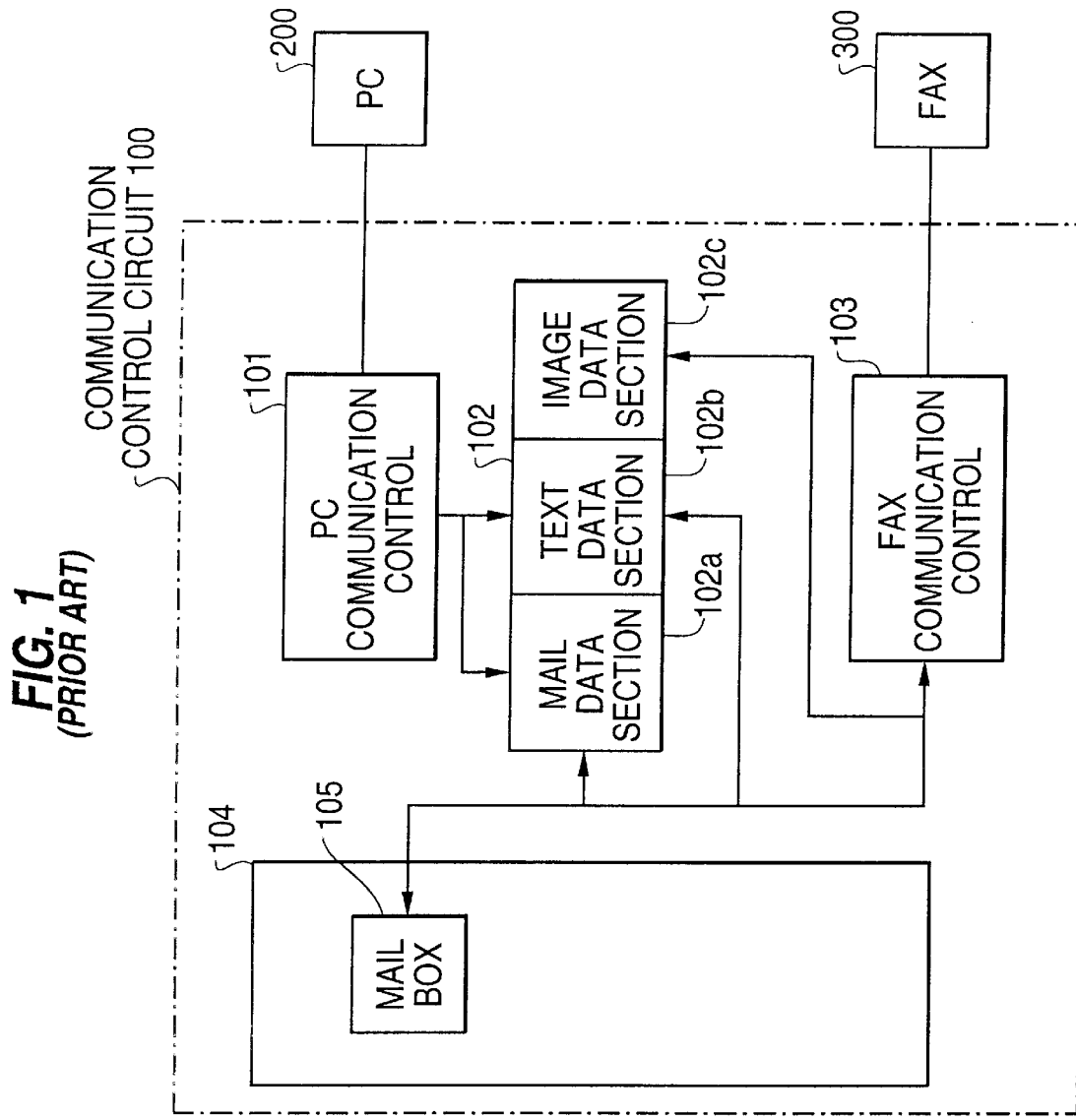
FIG. 1 is a block diagram illustrative of a multi-communication control apparatus of the prior art.

The first, second and third encoded image data stored in the image data memory 8 are read by the address generation/control circuits 77 through 79, and then transferred to the decoding circuit 9 illustrated in FIG. 1 via the data bus 82 through the data bus 86. The address bus 86 illustrated in FIG. 4 is the address bus connected to the decoding circuit 9.

Figure 6:
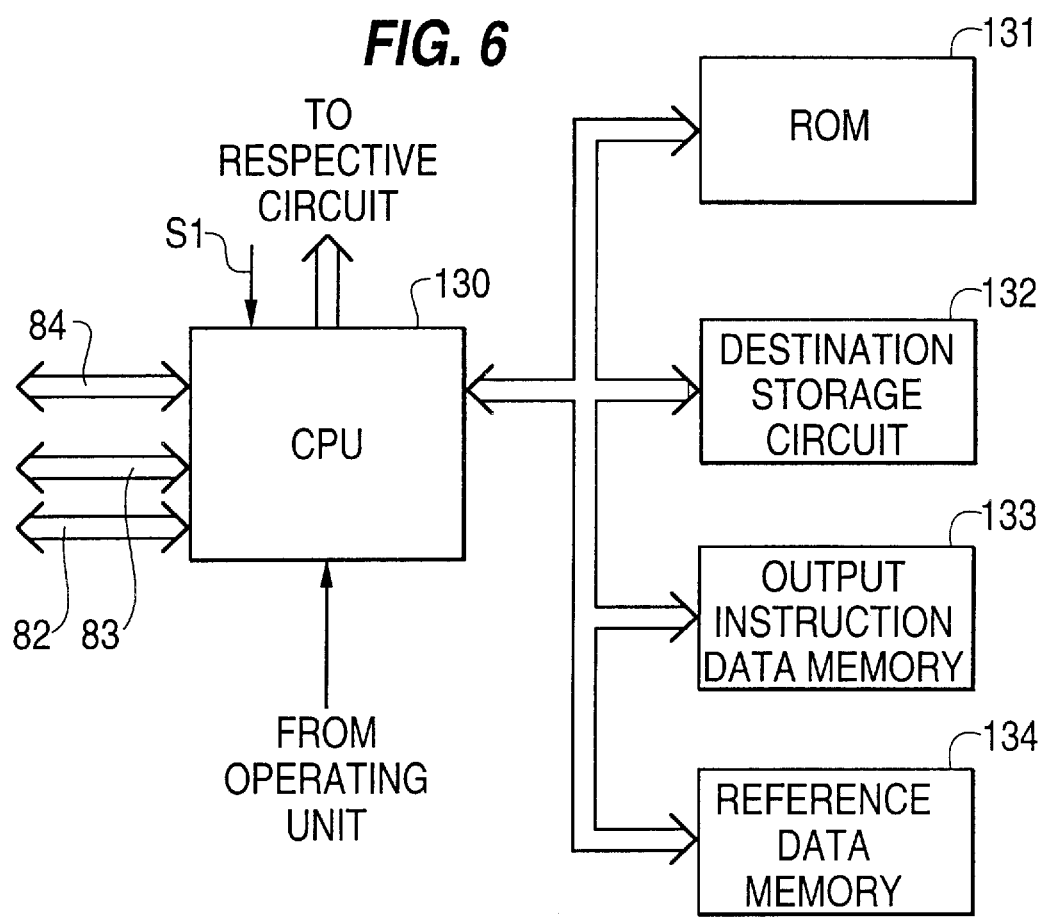
FIG. 6 is a block diagram illustrative of details of the main control circuit of the facsimile apparatus shown in FIG. 1.

Referring to FIG. 6, the main control circuit 13 comprises a central processing unit (CPU) 130; a ROM 131 storing programs for controlling the respective circuits; a destination storage circuit 132, an output instruction data memory 133 which constructs a destination information storage circuit which stores first through third destination information on the respective destinations of the first through the third encoded image data stored in the image data memory 8; and a reference data memory 134 which stores reference data representing the one-to-one correspondence between Files A, B and C, and the first, second and third encoded image data in the image data memory 8.

The destination storage circuit 132 stores the telephone number of the facsimile apparatus at the other end. After call operation by the stored telephone number, the first encoded image data or second encoded image data stored in the image data memory 8 is sent to the public line 15. This telephone number is supplied by operation with number buttons of the operating unit 14 of the facsimile apparatus illustrated in FIG. 1. The telephone number may be received from the PC 1 illustrated in FIG. 2, inputted to the CPU 130, and then stored in the destination storage circuit 132. Referring to FIG. 7, a storage area 132a of the destination storage circuit 132 stores the telephone number (first telephone number) of the sending destination of the first encoded image data corresponding to the print data from the PC 1, while a storage area 132*b* stores the telephone number (second telephone number) of the sending destination of the second encoded image data corresponding to the image data read by the image data read unit 3.

Figure 8:
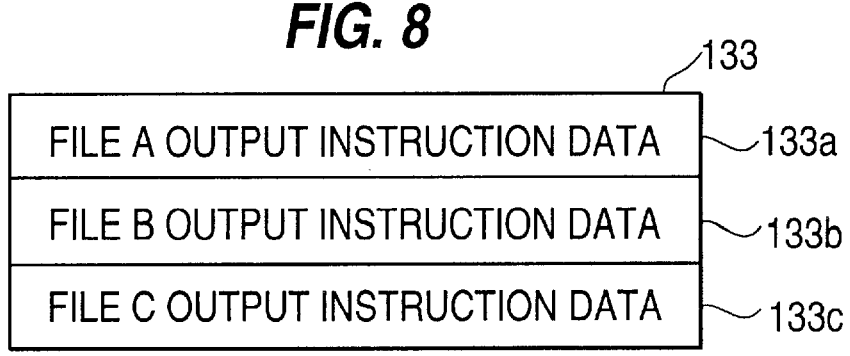
FIG. 8 is a block diagram illustrative of contents of the output instruction memory of the main control circuit shown in FIG. 6.

The output instruction data memory 133 stores output instruction data which designates output terminals for the encoded image data stored in Files A, B and C, respectively, in the image data block 8A illustrated in FIG. 5. The terminals are the facsimile apparatus at the other end which is connected to the public line 15 or the laser printer engine 10. Referring to FIG. 8, the destination storage circuit 133 has storage areas 133*a*, 133*b* and 133*c*. These storage areas 133*a*, 133*b* and 133*c* store output instruction data of Files A, B and C, respectively. The output destination of File A is the facsimile apparatus at the other end which is connected to the public line 15 and the laser printer emulator 10, the output destination of File B is the facsimile apparatus at the other end, and the output destination of File C is the laser printer emulator 10. These output destinations are designated by the operating unit 14 illustrated in FIG. 1, and stored by the CPU 130. The change of output destinations is carried out by the operating section 14.

Figure 9:
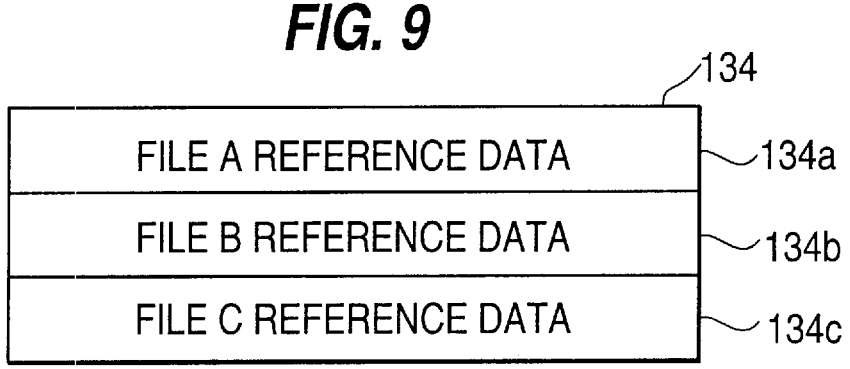
FIG. 9 is a block diagram illustrative of contents of the reference data memory of the main control circuit shown in FIG. 6.

The reference data memory 134 stores reference data on the one-to-one correspondence between Files A, B and C, and the first, second and third encoded image data. Referring to FIG. 9, the reference data memory 134 has storage areas 134*a*, 134*b* and 134*c*, and these storage areas 134*a*, 134*b* and 134*c* store reference data for Files A, B and C, respectively. The reference data for File A represents the first encoded image data, the reference data for File B, the second encoded image data, and the reference data for File C, the third encoded image data. The reference data for the respective files may be changed according to instructions from the operating unit 14. These reference data are also management information for designating files in which the first through third encoded image data from the encoding circuit 6 are to be stored.

The control operation of the CPU 130, and the operations of the respective sections of the main control circuit 13 will now be explained with reference to the respective drawings.

Upon receipt of a signal S1 announcing receipt of print data from the printer emulator 2, the CPU 130 illustrated in FIG. 6 sends an enable signal to the first encoder 6*a* (FIG. 3) of the encoding circuit 6 in response to the receipt. The CPU 130 then reads reference data from the reference data memory 134 to determine the file in which the first encoded image data from the first encoder 6*a* is to be stored. In cases where the first encoded image data is determined to be stored in File A based on the reference data, the CPU 130 controls the storage control circuit 7 through the control bus 84 so that the first encoded image data is stored in File A in the image data memory 8. Here, the CPU 130 controls the address generation/control circuit 77 through the address setting circuit 80, and the CPU 130 concurrently controls the enable control circuit 81 to enable the address generation/control circuit 77. Therefore, the first encoded image data from the FIFO memory 74 is stored in File A, having storage areas of numbers 1 through 40 of the image data block 8A illustrated in FIG. 5. The CPU 130 also controls the system so that the File A management block 8B-1 in the management data block 8B illustrated in FIG. 5 stores area numbers 1 through 40 as management information.

Upon completion of storing the first encoded image data in the image data memory 8, the CPU 130 reads the output instruction data of File A from the storage area 133*a* of the output instruction data memory 133 to determine the output destination. The output destination of the first encoded image data includes the facsimile apparatus at the other end and the laser printer engine 10.

Then, the CPU 130 controls the storage control circuit 7 to read the first image data stored in the image data memory 8. The storage control circuit 7 illustrated in FIG. 4 transfers the first encoded image data from the image data memory 8 to the decoding circuit 9 via the bus 86 according to addressing and read control by the address generation/control circuit 77. The CPU 130 then controls the laser printer engine 10 to print the first image data generated by decoding.

After completion of printing, the CPU 130 is given control of transmission of the first image data to the facsimile apparatus at the other end. First, the CPU 130 reads the telephone number of the facsimile apparatus at the other end from the destination storage circuit 132, and controls the communication control circuit 12 to dial up the facsimile apparatus. Response of the facsimile apparatus at the other end triggers control by the CPU 130 and the storage control circuit 7 to decode the first encoded image data and to transmit the first image data to the facsimile encoding circuit 11. The facsimile encoding circuit 11 encodes the first image data according to a facsimile coding scheme. Finally, the first encoded image data is transmitted to the facsimile apparatus at the other end through the communication control circuit 12.

Although the foregoing explanation is made with reference to the print data received from the PC 1, it also applies to the second image data which is generated by reading a document by the image data read section 3, and to the third image data which is generated by receiving image data from the facsimile apparatus at the other end. The CPU 130, in response to the second and the third image data, enables the second and the third encoders 6*b*, 6*c* of the encoding circuit 6, and enables the address generation/control circuits 78, 79 of the storage control circuit 7. The second encoded image data are stored in File B in the image data memory 8, and the third image data is stored in File C.

After completion of storing the second encoded image data in the image data memory 8, the CPU 130 reads the output instruction data of File B from the storage area 133*b* of the output instruction data memory 133, and determines the output destination. The output destination of the second encoded image data is the facsimile apparatus at the other end.

The CPU 130 is given control of transmission of the first encoded image data to the facsimile apparatus at the other end. First, the CPU 130 reads the telephone number of the facsimile apparatus at the other end from the destination storage circuit 132, and controls the communication control circuit 12 to dial up the facsimile apparatus. Response of the facsimile apparatus at the other end triggers the CPU 130 to control the storage control circuit 7 to read the first image data stored in the image data memory 8. The storage control circuit 7 illustrated in FIG. 4 transfers the second encoded image data from the image data memory 8 to the decoding circuit 9 via the bus 86 under addressing/read control of the address generation/control circuit 78. After completion of decoding, the second image data is transferred to the facsimile encoding circuit 11. The facsimile encoding circuit 11 encodes the second image data according to a facsimile coding scheme. The second encoded image data is transmitted to the facsimile apparatus at the other end through the communication control circuit 12.

On the other hand, the third encoded image data stored in the image data memory 8 is decoded through the decoding circuit 9, and then transferred to the laser printer engine 10 for printing.

According to the embodiment of the present invention described above, the data from the PC 1, the data from the image data read section 3 and the fax-received data are converted into the first through third image data in an identical data format, encoded according to a common coding scheme, and then stored in the image data memory 8. As a result, the first through third encoded image data in the image data memory 8 are placed under common management, and thus the operations for reading and writing the encoded image data are not complex. In addition, an individual buffer memory is not required for each of the data from the PC 1, the data from the binarizing circuit 4 and the fax-received data. The three image data are stored in the image data memory 8 as an encoded image data file, thus, the required memory capacity can be reduced accordingly.

The control circuit 13 is highly convenient, since the output destinations of the first, second and third encoded image data stored in the image data memory 8 can be set as desired by changing the output instruction data stored in the output instruction data memory 133 illustrated in FIG. 6.

It is also to be noted that the image data memory 8 is partitioned into a plurality of storage areas, and the storage areas for the first, second and third encoded image data are managed according to the management information. This allows efficient use of still unaddressed storage areas. The change of storage areas for the first through third encoded image data may also be easily accomplished.

According to the embodiment illustrated in FIG. 2, it is necessary for the printer emulator 2 to convert the print data from the PC 1 into dot data; nevertheless, this conversion into image data is not required in cases where the print data from the PC 1 are dot image data.

Figure 10:
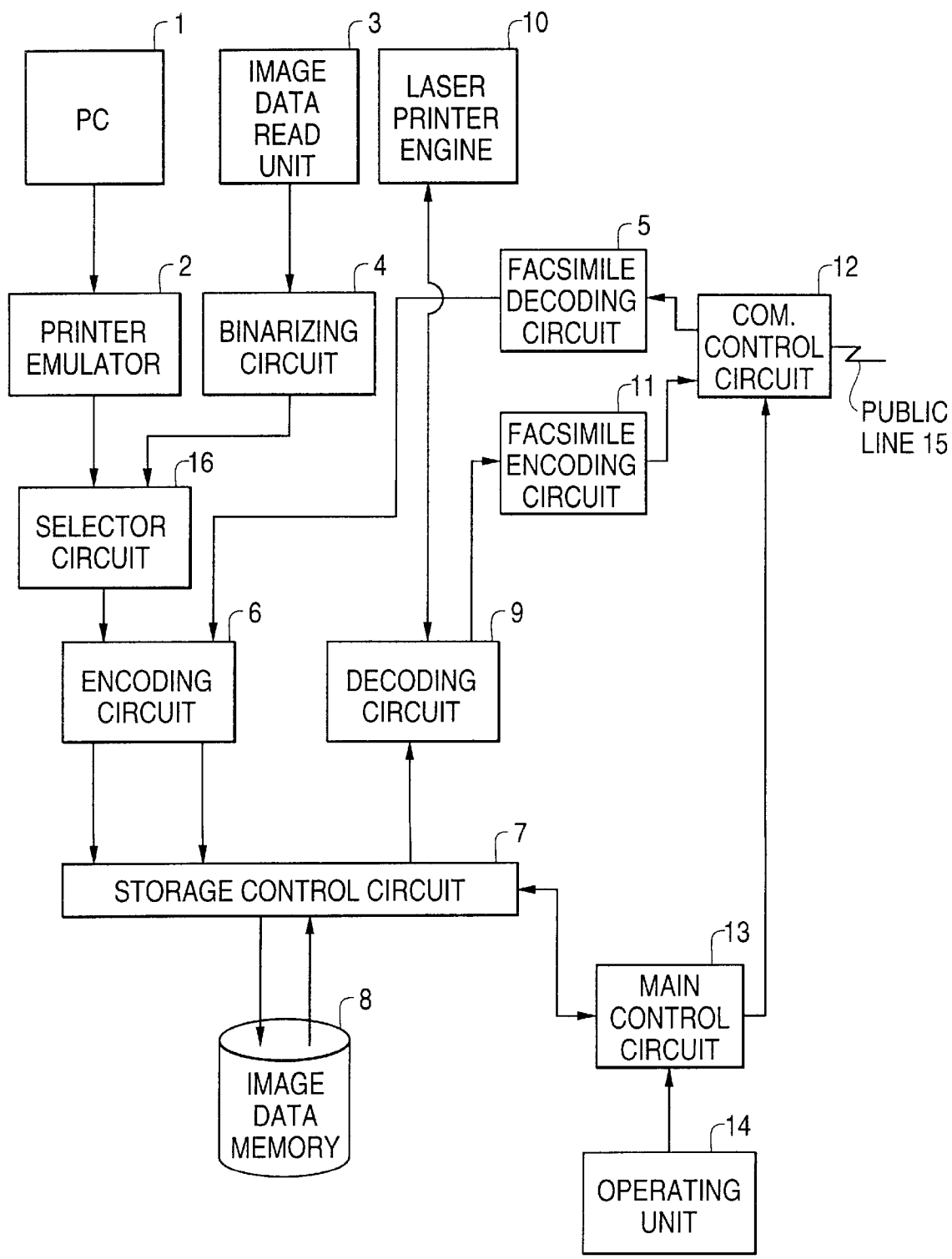
FIG. 10 is a block diagram illustrative of a communication system using a multi-function facsimile apparatus according to a second embodiment of the present invention.

FIG. 10 is a block diagram illustrative of a second embodiment of the present invention. In the drawing, the printer emulator 2 and the binarizing circuit 4 are connected to a selector circuit 16. This selector circuit 16 selects either the first or the second image data from the printer emulator 2 or the binarizing circuit 4 according to instructions from the control circuit 13. The control circuit 13 determines which has been generated earlier, the print data or the read image signal, under the control of the control circuit 13. The first image data is selected in cases where the print data has been generated earlier, whereas the second image data is selected in cases where the image signal is earlier generated. The first or second image data from the selector circuit 16, and the third image data from the facsimile decoding circuit 5 are supplied to the encoding circuit 6. The encoding circuit 6, which includes the three encoders in the embodiment illustrated in FIG. 2, includes two encoders (first and second encoders) here.

In cases where the image data from the selector circuit 16 is the first image data, the encoding circuit 6 generates the first encoded image data which is transferred to the S/P circuit 71 of the storage control circuit 7 illustrated in FIG. 4. In cases where the image data from the selector circuit 16 is the second image data, the encoding circuit 6 generates the second encoded image data which is transferred to the S/P circuit 72 of the storage control circuit 7 illustrated in FIG. 4. The operation of circuits connected subsequent to the storage control circuit 7 is the same as in FIG. 2.

According to the second embodiment, since the encoding circuit 6 has one fewer encoders than the first embodiment, when both the PC 1 and the image read section 3 access, processing of one of the image data must wait until encoding of the other image data and its storage in the image data memory 8 are completed. The wait control is executed by the control circuit 13.

In the respective embodiments explained above, the public line 15, which is a communication line for transmitting facsimile signals, may be an analog telephone line, or even a digital line such as ISDN line. The communication control circuit 12 executes the communication control matching each communication line to transmit information by facsimile.

In addition, another recorder circuit may be used instead of the laser printer emulator 10. According to the present invention, the recorder circuit is not restricted to a laser printer.

What is claimed is:

1. A facsimile apparatus connectible to a computer and a communication line for transmitting facsimile information, comprising:

means for generating first image data based on print data received from said computer;

means for generating second image data corresponding to scanned document data;

means for generating third image data based on information received from said communication line;

encoding means for encoding said first, second and third image data according to an identical coding scheme to generate first, second and third encoded image data, respectively;

image data storage means for storing said first, second and third encoded image data;

decoding means for decoding the first, second and third encoded image data stored in said image data storage means;

recording means for recording the image data decoded by said decoding means;

facsimile encoding means for encoding the image data decoded by said decoding means to generate encoded image data;

facsimile communication control means for sending the encoded image data from said facsimile encoding means to said communication line; and a control circuit for reading each of the first, second and third encoded image data stored in said image data storage means and supplying each of the first, second and third encoded image data to either said recording means or said facsimile encoding means via said decoding means.

2. The facsimile apparatus as claimed in claim 1, wherein said control circuit comprises a storage control circuit for controlling storage of said first, second and third encoded image data to said image data storage means; destination storage means for storing destination information designating the output destination of each of said first through third encoded image data stored in said image data storage means; and main control means, based on said destination information, for supplying said first, second and third encoded image data stored in said image data storage means to at least one of said recording means and said facsimile encoding means via said decoding means.

3. The facsimile apparatus as claimed in claim 2, wherein said control circuit further comprises destination input means for inputting said destination information to be stored in said destination storage means.

4. The facsimile apparatus as claimed in claim 2, wherein said image data storage means has first, second and third files in separate storage areas, and said main control means has means for storing management information designating one-to-one correspondence between the information stored in said first, second and third files by said storage control circuit, and said first, second and third encoded image data.

5. The facsimile apparatus as claimed in claim 4, wherein said image data storage means has an image data storage block divided into a plurality of storage areas and a management block, said plurality of storage areas are allotted to said first, second and third files, said management block stores area information indicating the storage areas allotted to said first, second and third files on a file basis, and said main control means controls said storage control circuit based on said area information contents stored in said management block to read said first, second and third files.

6. The facsimile apparatus as claimed in claim 1, wherein said means for generating first image data is a printer emulator which converts said print data into dot data to generate said first image data.

7. The facsimile apparatus as claimed in claim 1, wherein said encoding means comprises a first encoder for encoding said first image data based on a predetermined encoding rule to generate the first encoded image data, a second encoder for encoding said second image data based on said encoding rule to generate the second encoded image data, and a third encoder for encoding said third image data based on said encoding rule to generate the third image data.

8. The facsimile apparatus as claimed in claim 1, wherein said encoding means comprises a selector circuit for selecting either said first image data or said second image data, a first encoder for encoding said first or second encoded image data selected to generate the first or the second encoded image data, and a second encoder for encoding said third image data to generate the third encoded image data.

* * * * *